United States Patent [15] 3,668,315
Heitzman [45] June 6, 1972

[54] RECEIVER TIMING AND SYNCHRONIZATION SYSTEM

[72] Inventor: James O. Heitzman, Fullerton, Calif.
[73] Assignee: Hughes Aircraft Company, Culver City, Calif.

[22] Filed: May 15, 1970
[21] Appl. No.: 37,790

[52] U.S. Cl. ......... 178/69.5 R
[51] Int. Cl. ......... H04n 1/36
[58] Field of Search ......... 178/69.5

[56] References Cited

UNITED STATES PATENTS

| | | | |
|---|---|---|---|
| 3,493,679 | 2/1970 | Chomicki | 178/69.5 |
| 2,843,669 | 7/1958 | Six et al. | 178/69.5 |
| 3,033,928 | 5/1962 | Biggam et al. | 178/69.5 |
| 3,185,963 | 5/1965 | Peterson et al. | 178/69.5 |
| 3,376,385 | 4/1968 | Smith et al. | 178/69.5 |

*Primary Examiner*—Richard Murray
*Attorney*—W. H. MacAllister, Jr. and Ernest L. Brown

[57] ABSTRACT

A receiver timing and synchronization system useful in a digital data communication system for providing timing signals synchronized with received digital data. The receiver system includes means for providing small incremental changes in the locally generated timing signals to maintain synchronization as well as means for enabling synchronization to be maintained during signal fades. In addition, means are provided for rapidly re-synchronizing the timing signals to data received from a new transmitter. Incremental timing signal adjustments are made by determining whether a data signal transition occurs during an early, on time, or late portion of a bit period. If a data transition occurs during early or late portions, the timing signal is either incrementally advanced or retarded. If data transitions occur during corresponding portions of n successive bit periods outside of the on time portion, then the timing signal is jammed into synchronization with the recurring data transitions.

14 Claims, 3 Drawing Figures

RESYNCHRONIZATION CIRCUIT

INVENTOR.
JAMES O. HEITZMAN,
BY
Walter J. Adam
ATTORNEY.

RECEIVER TIMING AND SYNCHRONIZATION SYSTEM

The invention herein described was made in the course of or under a Contract or Subcontract thereunder with the Air Force.

BACKGROUND OF THE INVENTION

This invention relates generally to digital data communication systems and more particularly, to a receiver timing and synchronization system for providing timing signals synchronized with received data.

Digital data communication systems can be comprised of a plurality of modems (modulators-demodulators) communicating on a common channel. Each receiver or demodulator must generate its own timing signals in synchronism with the received data in order to reliably resolve the data bit pattern. Thus, the receiver must include means for detecting the occurrence of data transitions and for synchronizing the locally generated timing signals therewith. Inasmuch as noise may sometimes be encountered on the channel, it is usually desired to maintain synchronization through a signal fade up to a maximum interval of, for example, 200 milliseconds. In addition to it being desirable to maintain synchronization, it is also desirable that the receiver be able to recognize and re-synchronize to a data signal from a new transmitter within a certain maximum number of bit periods, e.g., nine.

SUMMARY OF THE PRESENT INVENTION

The present invention is directed to a receiver timing and synchronization system which permits synchronization to be maintained through a signal fade and which, in addition, provides for rapid re-synchronization to a new data signal.

In the preferred embodiment of the invention, means are provided for generating "early," "on time" and "late" gating signals during each bit period of a locally generated receiver timing signal. The received data is monitored to determine whether transitions occur during the on time gating signal. When transitions occur during the on time gating signal, a counter is incremented and when they occur during the early or late gating signals, the counter is decremented. Additionally, transitions occurring during the early or late gating signals, respectively incrementally advance and retard the timing signal to thus correspondingly shift succeeding early, on time, and late gating signals. When the counter reaches an upper limit, e.g. 7, a synchronization flip-flop is set, meaning that synchronization has been achieved. If the counter is then decremented to some lower count, e.g., 4, a timer is turned on to inhibit any corrective action during a tolerable signal fade interval (e.g. 200 milliseconds). If the counter is subsequently decremented to a lower level, e.g., 0, then the synchronization flip-flop is reset meaning that synchronization has been lost.

In accordance with a significant aspect of the present invention, re-synchronization means are provided for continually monitoring the received data to effectively recognize data transitions occurring outside of the on time gating signal. If data transitions occur during substantially corresponding positions of a predetermined number of successive bit periods outside of the on time gating signal, then the timing signal is jammed into synchronization with the recurring data transitions.

In accordance with a further significant aspect of the present invention, the re-synchronization means monitors the time of occurrence of the data transitions by generating a "-sliding gate" signal which, during successive bit periods, will slide with respect to the bit period timing then being defined. In other words, the sliding gate signal will occur at different portions of successive bit periods, until it coincides or brackets a data transition. Thereafter the position of the sliding gate signal in the bit period will be maintained for so long as it continues to bracket succeeding data transitions. After a predetermined number of bit periods in which the sliding gate brackets the data transitions, the timing signal will be jammed into synchronization with the sliding gate signal and thus with the recurring data transitions.

DESCRIPTION OF THE PREFERRED EMBODIMENT

Figure 1:
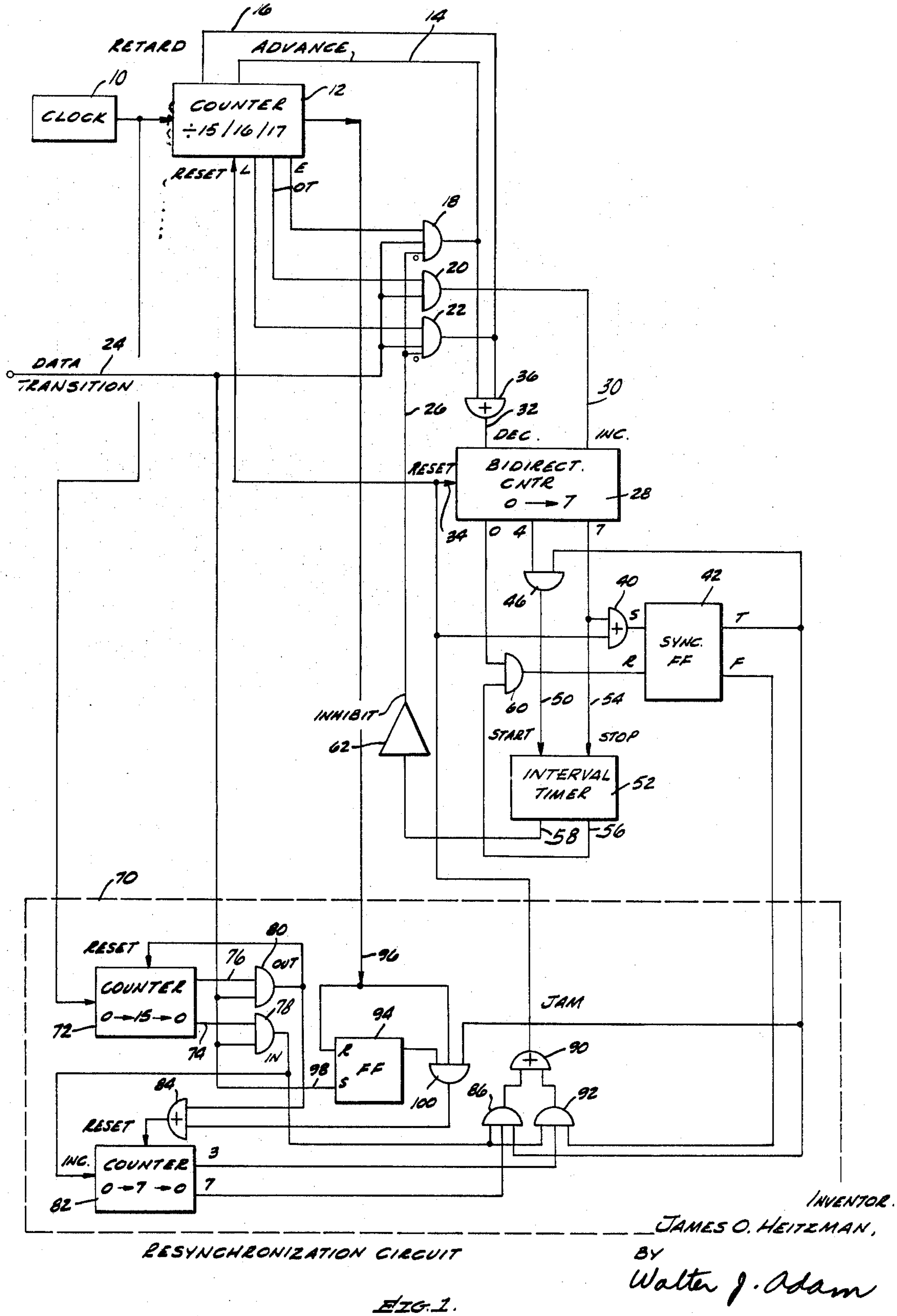
FIG. 1 is a block diagram of a preferred embodiment of the present invention.

Attention is now called to FIG. 1 which illustrates a preferred embodiment of a receiver timing and synchronization system, in accordance with the present invention. As will become apparent hereinafter, the timing and synchronization system of the present invention finds utility in receivers or receiver sections of modems (modulator-demodulator) employed in digital data communication systems. In such applications, it is usually required that timing signals be generated at the receiver in synchronism with the received data in order to reliably resolve the data bit pattern. The present invention is primarily directed to a system for generating such timing signals in synchronism with the received data. In the design of such a timing system, it is normally important to assure that synchronization, once achieved, be maintained through a signal fade of a certain duration. Additionally, it is also important that the timing signals be able to rapidly re-synchronize to new data.

In the system of FIG. 1, a source 10 of high frequency clock pulses is provided for defining the basic system timing. The clock pulse source 10 drives a counter 12 which operates to define data bit periods used to resolve received digital data. It will be understood that the timing signals mentioned hereinafter refer to the signals developed by the counter 12. Thus, it will also be understood that adjustment of the timing signals, either by jamming or incrementally, refers to a revision of the count sequence of counter 12.

For exemplary purposes herein, it will be assumed that the counter 12 is normally a scale of 16 counter which defines counts from 0 to 15 in sequence in response to pulses provided by the source 10. As will be seen hereinafter, one cycle of the counter 12 will define a bit period and thus each bit period will normally be comprised of 16 counts. However, in order to incrementally adjust the timing, for purposes to be discussed in greater detail hereinafter, the counter 12 is constructed so that it can selectively define a greater or lesser number of counts during any cycle. More particularly, in response to an enabling signal applied to the advance input terminal 14 of the counter 12, the counter will thereafter define 15, rather than 16 counts during one bit period. On the other hand, an enabling signal applied to retard input terminal 16 will cause the counter to thereafter define seventeen counts during one bit period.

Various implementations of the counter 12 will readily occur to those skilled in the art. Suffice it to say that the conceptually simplest implementation could comprise a 17 stage ring counter with the output of the 16th stage normally being applied to the input of the first stage but with gating being provided for selectively coupling the output of either the 15th or 17th stages back to the first stage.

Figure 2:
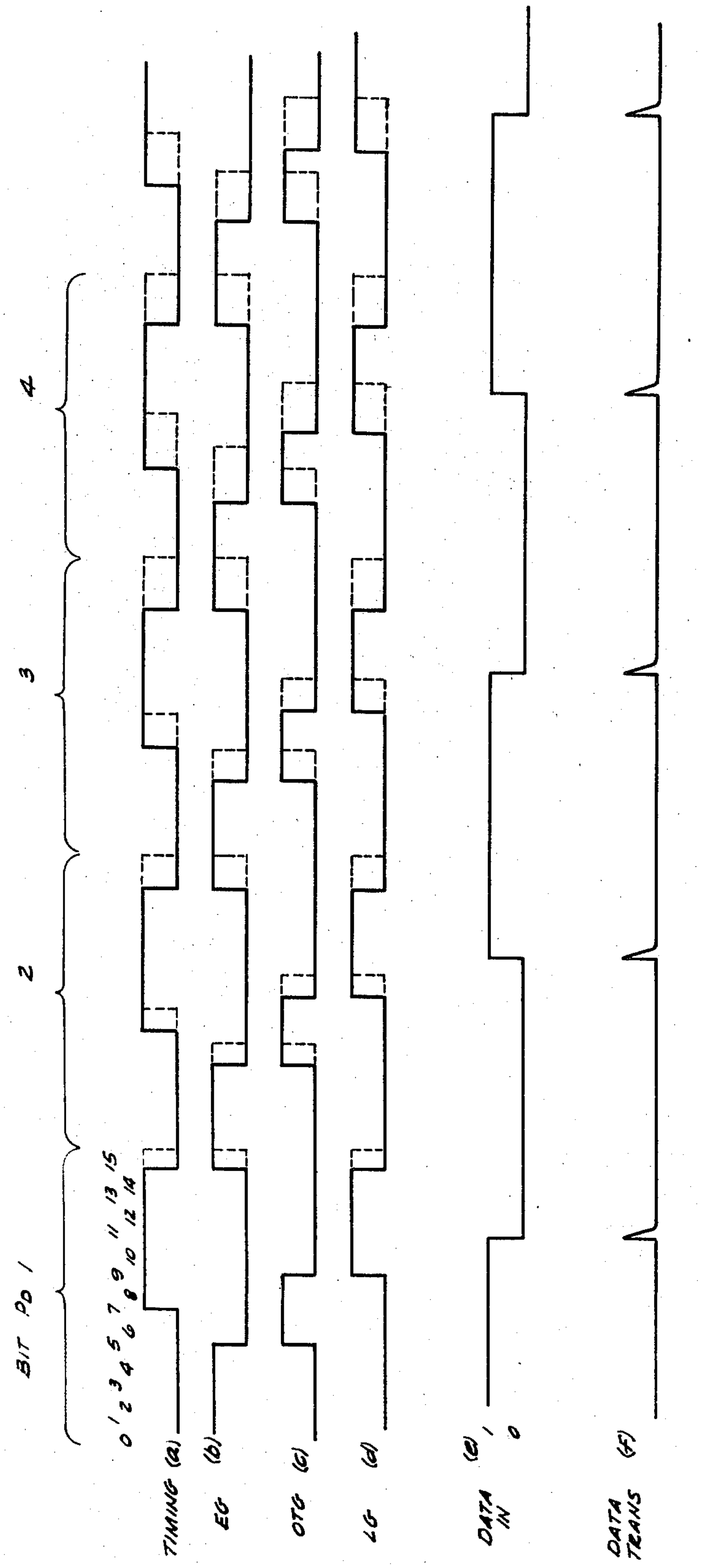
FIG. 2 is a timing diagram illustrating the manner in which the system of FIG. 1 operates to incrementally modify the timing signal.

Line (*a*) of FIG. 2 illustrates, in solid line, a timing signal normally defined by counter 12. As will be noted, the timing signal of line (*a*) is illustrated as being at a low level during counts 0 through 7 and at a high level during counts 8 through 15. In response to the counts defined by counter 12, early, on time, and late, gating signals, as shown in lines (*b*), (*c*) and (*d*) respectively of FIG. 2, are generated during each bit period. In the exemplary embodiment of the invention, it has been assumed that the early gating signal is developed during counts 0 through 5, the on time gating signal during counts 6 through 9 and the late gating signal during counts 10 through 15. These gating signals are respectively applied, as shown in in FIG. 1, to the inputs of AND gates 18, 20 and 22. In addition, the data transition input line 24 is coupled to the inputs of gates 18, 20 and 22. An inhibit line 26, to be discussed hereinafter, is connected to the inputs of gates 18 and 22.

Line (*e*) of FIG. 2 illustrates a typical sequence of data bits comprised alternately of 1's and 0's, which may be transmitted via a communication channel to the receiver of which the system of FIG. 1 forms a part. Line (*f*) of FIG. 2 illustrates the data transitions within the digital data shown in line (*e*). Note during bit period 1 that the data transitions shown in line (*f*) occur during the late gating signal of line (*d*). In order to enable the digital data to be properly resolved, it is important that the timing signal [of line (*a*)] be adjusted so as to produce the on time gating signal coincident with the data transition. In order to incrementally adjust the timing signal, the output of gate 22 shown in FIG. 1 is connected to the retard input terminal 16 of counter 12 to thus extend the counter cycle by one count as shown in dotted line (*a*) of FIG. 2. Thus, the timing signal is retarded by one-sixteenth of a bit period and of course the early, on time and late gating signals are also correspondingly retarded. During bit period 2 shown in FIG. 2, the data transition still occurs coincident with the late gating signal rather than with the on time gating signal. As a consequence, gate 22 of FIG. 1 will again apply an enabling signal to the retard input terminal 16 of counter 12 to again retard the timing signal by an additional one-sixteenth of a bit period as well as the early, on time, and late gating signals. During the succeeding bit period 3, the data transition is still coincident with the late gating signal thus causing the counter 12 to again be retarded by an additional one-sixteenth of a bit period. As shown in FIG. 2, during bit period 4, the on time gating signal will coincide with the data transition to thereby terminate further incremental adjustment of the timing signal as long as the achieved synchronized condition is thereafter maintained.

It is pointed out that if the data transitions shown in FIG. 2 had occurred coincident with the early gating signal, rather than the late gating signal, then the cycle of counter 12 would have been foreshortened by one-sixteenth of a bit period to thereby advance the timing signal until the on time gating signal coincided with the data transition.

It is emphasized that the quantities referred to in the example represented by FIG. 2 are exemplary only and have been selected to facilitate an easy understanding of the operation of the system. In actuality, it would probably be desirable to modify the timing signal by much smaller increments than one-sixteenth of a bit period. For example, in a system which has been constructed employing the teachings of the present invention, the timing signal is modified in increments less than 1 percent of a bit period. It will be recognized that in order to employ this finer resolution, the counter 12 will have to define a greater number of counts per bit period or alternatively, the function of the counter 12 shown in FIG. 1 will be performed by two counters connected in tandem which in combination define a greater number of counts per bit period.

Thus far, the function of the gates 18 and 22 has been considered only with respect to the modification of the timing signal. However, the outputs of gates 18, 20 and 22 are additionally utilized to indicate when the timing signal is synchronized as well as for other purposes.

More particularly, a bidirectional counter 28 is provided having an increment input terminal 30 and a decrement input terminal 32. In addition, the counter 28 has a reset input terminal 34 which, when pulsed, resets the counter 28 to a count of 0. For exemplary purposes, it will be assumed that the counter 28 is able to count from 0 to 7.

The output of gate 20 is connected to the increment input terminal 30. Thus, when a data transition appears on line 24 coincident with an on time gating signal, the counter 28 will be incremented. On the other hand, when the data transition appears coincident with either the early or late gating signals, the counter 28 will be decremented. Decrementing is accomplished as a consequence of the outputs of gates 18 and 22 being coupled to the inputs of OR gate 36 whose output is connected to the decrementing input terminal 32 of counter 28.

In the exemplary system illustrated, three output terminals respectively representing counts 0, 4 and 7, of counter 28 are utilized. The count 7 output terminal of counter 28 is connected to the input of an OR gate 40 whose output is connected to the set input terminal of a sync flip-flop 42. Thus, whenever the bidirectional counter 28 is driven to its upper count of 7, the sync flip-flop 42 is set.

The counter 28 count 4 output terminal is connected to the input of an AND gate 46. A second input to the AND gate 46 is derived from the true output terminal of the sync flip-flop 42. Thus, when the sync flip-flop 42 is true, meaning that the timing signal has been synchronized, and the bidirectional counter 28 is thereafter decremented to a count of 4, the gate 46 will provide an enabling signal to the start input terminal 50 of an interval timer 52. The interval timer is capable of defining a fixed interval, for example, 200 milliseconds, corresponding to a tolerable signal fade interval. The purpose of the interval timer 52 is to introduce a period during which no corrective action is taken. The reason for employing a timer 52 is to enable the system to tolerate short bursts of signal fade attributable to noise.

Whereas, the output of gate 46 is connected to the start input terminal 50 of timer 52, the count 7 output terminal of counter 28 is connected to the stop input terminal 54. The timer 52 is provided with an off output terminal 56 and an on output terminal 58 which represent the state of the timer 52. The off terminal 56 is connected to the input of an AND gate 60 together with the count 0 output terminal of counter 28. The output of gate 60 is connected to the reset input terminal of the sync flip-flop 42. The on output terminal 58 of timer 52 is connected through an inverter 62 as an inhibit to the previously mentioned AND gates 18 and 22.

In the operation of the system to the extent thus far described, the timing signal produced by the counter 12 will be incrementally advanced or retarded to synchronize it with the recurring data transitions. If the data transitions occur within the on time gating signal during seven successive bit periods, the counter 28 will be incremented to a count of 7 thus setting the sync flip-flop 42 and establishing a synchronized state. If, thereafter, the data transitions, for some reason, start occurring outside of the on time gating signal, then the bidirectional counter 28 will be decremented and when it reaches a count of 4, the interval timer 52 will be turned on via gate 46. With the interval timer 52 on, gates 18 and 22 will be disabled, via inverter 62 to thus prevent any further modification of the timing signal as well as preventing further decrementing of bidirectional counter 28. After the timer 52 has timed out, if the timing signal is still not synchronized, the counter 28 will be decremented down to 0 at which time the gate 60 will be enabled to reset the sync flip-flop 42. The interval timer 52 is selected such that it requires a short off time between on times such that after it times out, the conditions on gate 46 which initially turned it on will not immediately turn it on again. That is, the required off time of the timer 52 is sufficient to assure that the counter 28 will decrement down at least one count from the count of 4 after the timer 52 has timed out.

It will be appreciated that the portion of the system of FIG. 1 thus far discussed relates to means for maintaining the timing signal synchronized with the occurrence of data transitions. In accordance with the present invention, the resynchronization circuit 70 is provided for rapidly jamming the timing signal into synchronization with a data signal provided by a new transmitter, i.e., a transmitter first coming on to the communication channel.

The resynchronization circuit 70 is comprised of a first cyclic counter 72 which, in accordance with the assumed exemplary embodiment of the invention, defines counts 0 through 15. The counter 72 is driven from the clock pulse source 10. The counter 72 is used to define what will hereinafter be referred to as a sliding gate signal, having a width of one-fourth bit period, during each cycle. More particularly, it will be assumed that the counter 72 provides a true output signal on output terminal 74 during counts 0, 1, 2 and 3 of the counter cycle. During counts 4 through 15 defined by counter 72, the counter will provide a true output signal on terminal 76.

Output terminals 74 and 76 of counter 72 are respectively connected to the input of gates 78 and 80. The data transition line 24 is connected to the input of both gates 78 and 80. If a data transition occurs during a sliding gate signal, then gate 78 will provide a true output signal to increment a counter 82. On the other hand, if a data transition occurs outside of the sliding gate signal, gate 80 will reset the cyclic counter 72, to a count of 1, for example, to thus cause the sliding gate signal to bracket the data transition. In addition, the output of gate 80 resets the counter 82 to a count of 0, via OR gate 84.

Accordingly, the resynchronization circuit 70 effectively monitors the data transitions in parallel with the earlier described gates 18, 20 and 22, for the purpose of jamming the timing signal produced by counter 12 into synchronization with recurring data transitions which occur in corresponding portions of a predetermined number of successive bit periods. More particularly, it should be appreciated that the counter 82 will count the number of successive bit periods during which a data transition occurs within the sliding gate signal defined by cyclic counter 72. If during a bit period a data transition occurs out of the sliding gate signal, then the sliding gate signal is moved to bracket that data transition and the counter 82 is reset. If a data transition occurs during the same portion of seven successive bit periods, counter 82 will have counted up to a count of seven and thus will enable the count seven output terminal illustrated in FIG. 1. The count 7 output terminal is connected to the input of gate 86. The output of gate 78 evidencing the occurrence of a data transition within the sliding gate is also connected to the input of gate 86. In addition, the true output terminal of sync flip-flop 42 is connected to the input of gate 86. Thus, gate 86 is enabled when the sync flip-flop 42 defines a synchronized condition and after eight bit periods during which data transitions occur within the sliding gate signal. When the output of gate 86 goes true, it jams a reset signal, via OR gate 90, to both the bidirectional counter 28 and the timing signal counter 12. In addition, it sets the sync flip-flop 42 via OR gate 40.

Figure 3:
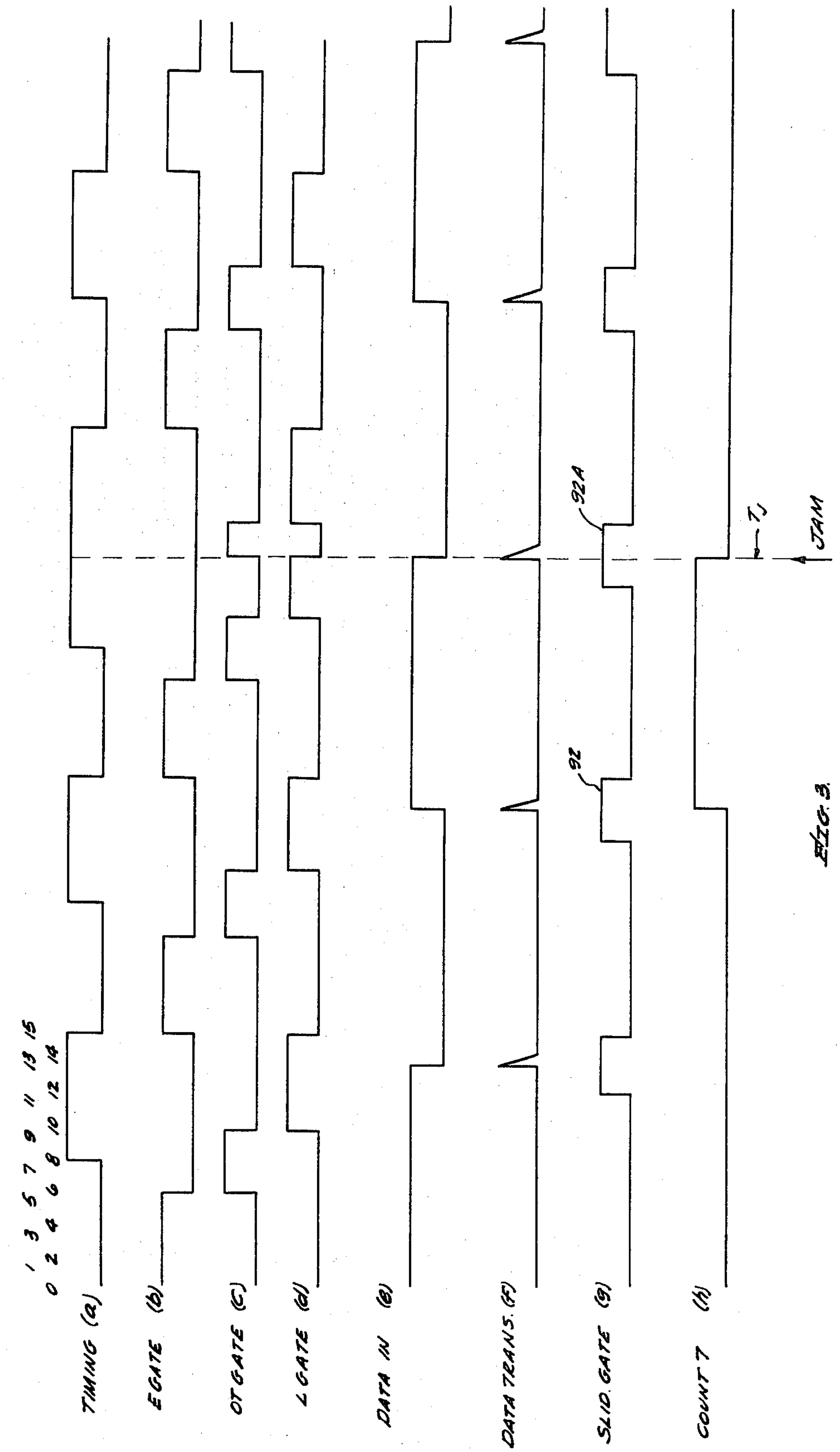
FIG. 3 is a timing diagram illustrating the manner in which the system of FIG. 1 operates to jam the timing signal into synchronization with a new data transmission.

In order to better understand the operation of the portion of the resynchronization circuit 70 thus far discussed, attention is called to FIG. 3 which in lines (*a*) through (*f*) is quite similar to FIG. 2. Line (*g*) of FIG. 3 illustrates the sliding gate signal produced by cyclic counter 72. It is assumed that the concurrence of the sliding gate 92 together with a data transition switches counter 82 to to a count of seven. Accordingly, the occurrence of the next succeeding sliding gate (92A) concurrent with a data transition enables the gate 86 to thus jam the counter 12 to a particular state, assumed to be count 8 in the exemplary embodiment represented in FIG. 3. That is, at time $T_J$, defined by the concurrence of sliding gate 92A, count 75 by counter 82, and the occurrence of a data transition, the counter 12 will be switched to a count 8 as shown in line (*a*) of FIG. 3.

It is pointed out that the true output terminal of sync flip-flop 42 is included as a term to the AND gate 86 because when the system is synchronized, it is desired that it not be jammed unless data transitions occur within the sliding gate outside of the on gate signal for at least eight bit periods. On the other hand, if the system is not synchronized (i.e., sync flip-flop 42 false) then it is desired that jamming occur after only four bit periods. In order to assure this, the count three output terminal of counter 82 is connected to the input of AND gate 92. The output of AND gate 78 is also connected to the input of AND gate 92 along with the false output terminal of sync flip-flop 42. Thus, AND gate 92 will provide a jam signal, via OR gate 90, in response to counter 82 defining a count of only three, if the system is not synchronized.

If the system is synchronized, it is desired to form the jam signal only if data transitions occur within the sliding gate during eight successive bit periods. If a data transition fails to occur during any one of those periods, it is desired to reset the bit period counter 82 and to start counting bit periods over again. The flip-flop 94 is provided in order to recognize the failure of a data transition to occur during a bit period. The flip-flop 94 is reset via line 96 at the beginning of each bit period. Flip-flop 94 is set, via its input terminal 98, by the occurrence of a data transition. The false output terminal of flip-flop 94 is connected to the input of gate 100. The signal evidencing the beginning of a bit period applied to the set input terminal of flip-flop 94 is also coupled to the input of gate 100. The true output terminal of sync flip-flop 42 is also connected to the input 100. Thus, at the beginning of each bit period the flip-flop 94 is reset. If no data transition occurs within the bit period, the flip-flop 94 remains reset throughout the bit period and thus at the beginning of the next bit period, AND gate 100 will be enabled to provide a reset pulse to counter 82 via OR gate 84. Thus, counter 82 will thereafter start from 0 to count the number of successive bit periods during which data transitions occur within the sliding gate.

From the foregoing, it should be recognized that a timing and synchronization system has been disclosed herein for use in a receiver for enabling a locally generated timing signal to be maintained synchronized with received data signals as well as for assuring that the timing signal is rapidly jammed into synchronization with any new data signals appearing on the communication channel.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus useful in a digital data receiver for generating successive bit period timing signals in predetermined time relationship with respect to received digital data transitions, said apparatus comprising:

a source of clock pulses;

first counter means responsive to said clock pulses for generating timing signals defining successive bit periods;

first gating means responsive to the occurrence of a data transition during a discrete early portion of a bit period connected to said first counter means to reduce the duration of a single subsequent bit period;

second gating means responsive to the occurrence of a data transition during a discrete late portion of a bit period connected to said first counter means to increase the duration of a single subsequent bit period;

second counter means responsive to said clock pulses for defining a plurality of discrete clock pulse counts during each of said bit periods;

means responsive to data transitions for resetting said second counter means to cause its count, in each of said bit periods, to be reset to bracket a data transition within a predetermined count range of said second counter means;

third counter means for counting the number of successive bit periods in which data transitions occur that are bracketed by said predetermined count range of said second counter means;

means responsive to a predetermined count of said third counter means for causing said first counter means to thereafter define bit periods bearing a predetermined time relationship to said predetermined count range of said second counter means.

2. The apparatus of claim 1 in which the improvement further comprises:

a bidirectional counter;

means responsive to the occurrence of a data transition during a discrete intermediate portion, between said early and late portions, of a bit period for incrementing said bidirectional counter;

means responsive to the occurrence of a data transition during said discrete early or said discrete late portions of a bit period for decrementing said bidirectional counter;

storage means responsive to a high count of said bidirectional counter for indicating a synchronized state and to a low count of said bidirectional counter for indicating a nonsynchronized state of said timing signals with received additional data transitions;

an interval timer;

third gating means, connected to start said timer, and responsive to a predetermined intermediate count of said bidirectional counter and to an indication of a synchronized state by said storage means; and means for inhibiting said first and second gating means while said timer is energized.

3. A receiver timer and synchronization system useful in a digital data communication system for providing timing signals synchronized with received digital data, comprising:

a first recirculating counter means, having $n$ ordered digital states defining a bit period, including controllable means for advancing said counter means by one digital state, controllable means for retarding said counter means by one digital state, controllable means for resetting said counter means to a predetermined digital state $m$, $m$ being approximately one-half of $n$, a first output terminal energized when said digital states are within a predetermined range of said digital state $m$, a second terminal adapted to be energized when said counter is in a digital state below said range, a third terminal adapted to be energized when said counter is in a state above said range, and a fourth terminal adapted to produce said timing signals at the beginning of said period;

clock means adapted to produce a clock frequency which is n times the frequency of said timing signals, connected to index said counter means;

first AND gating means, connected by its input terminals to said second output terminal of said counter means and to said data terminal, the output of said first gating means being connected to advance said counter means by one digital state;

second AND gating means connected by its input terminals to said third output terminal of said counter means and to said data terminal, the output terminal of said second gating means being connected to retard said counter means by one digital state; and a resynchronization circuit connected to receive at least clock pulses from said clock means and data from said data terminal, said resynchronization circuit being adapted to deliver a reset pulse to the reset terminal of said first recirculating counter means to set the digital state of said counter means to its $m$ state in synchronism with a data transition received at said data terminal, but only after said data transition is received within a range of positions in a predetermined number of periods.

4. Apparatus as recited in claim 3 in which said resynchronization circuit comprises:

a second recirculating counter means having n ordered digital states and adapted to be reset to a predetermined digital state $p$, having a first terminal which is energized within a predetermined third range of digital states including said state $p$ of said second counter, and having a second terminal which is energized when said fifth terminal is not energized, said counter being connected to said clock means to be stepped thereby;

a third AND gating means connected by its input terminals to said first terminal of said second counter means and said data terminal;

a fourth AND gating means connected by its input terminals to said second terminal of said second counter means and said data terminal, the output of said fourth gating means being connected to reset said second recirculating counter means;

a third counter means having $q$ ordered binary counting states, being connected to the output terminal of said fourth gating means to be reset thereby to its initial counting state, and being connected to the output of said third AND gating means to be incremented thereby;

fifth AND gating means connected by its input terminals to receive signals at least from the output of said third gating means and said third counter means when said third counter means is in a predetermined digital state $h$, the output of said fifth gating means being connected to deliver a reset signal to the reset terminal of said first counter means.

5. The combination as recited in claim 4 and further comprising:

sixth AND gating means being connected by its input terminals to said first output terminal of said first counter means and to said data terminal;

a fourth bidirectional counter means having s ordered digital states, adapted to be reset, incremented, and decremented, having first, second, and third output terminals, said first terminal being energized during the zero state of said fourth counter means, said second terminal being energized during the $r$ state of said fourth counter means, and the third terminal being energized on the s state of said fourth counter means, wherein $r$ is approximately equal to one-half of $s$, the output of said sixth gating means being connected to increment said fourth counter means, the output of said first or second gating means being connected to decrement said fourth counter means;

a first switching means having two input terminals and two output terminals, said switching means energizing a first of its output terminals when a first of its input terminals is energized and switching to a second of its output terminals when a second of its input terminals is energized;

a seventh AND gating means connected by its input terminals to said first output terminal of said switching means and to said second output terminal of said fourth counting means;

an interval timer means having start and stop input terminals and first and second output terminals, the first said output terminal being energized when said timer means is timing and the second said output terminal being energized when said timer is not timing, said start input terminal being connected to the output terminal of said seventh gating means, said stop input terminal being connected to said third output terminal of said fourth counting means;

eighth AND gating means connected by its input terminals to said first output terminal of said fourth counting means and to the second output terminal of said interval timer means, the output terminal of said eighth gating means being connected to the second said input terminal of said switching means;

said first output terminal of said interval timing means being connected to inhibit operation of said first and second gating means; and said first input terminal of said first switching means, and the reset terminal of said fourth counting means being energized by the output signal of said fifth gating means.

6. Apparatus as recited in claim 5 and further comprising means connected at least to the fourth terminal of said first counter means to receive signals therefrom and to said data terminal to receive signals therefrom to produce an output signal when data transition signals are not received during two consecutive bit periods of said first counting means, and connected to reset said third counter means in response to said last-named output signal.

7. Apparatus as recited in claim 6 in which said third counter means has two output terminals, one adapted to be energized when said third counting means is in its $q$ counting state and the other being energized when said third counting means is in its $k$ counting state, $k$ being approximately one-half of $q$;

ninth AND gating means, having its input terminals connected to the output of said third gating means, the output of said second terminal of said first switching means, and to receive a signal from said third counting means when said third counting means is in its $k$ digital state;

said fifth AND gating means being connected to receive signals from the output of said third AND gating means, said first terminal of said first switching means, and said third counting means when said third counting means is in its *q* digital counting state;

first OR gating means, connected to receive the outputs of said fifth and ninth AND gating means and to deliver signals to said reset terminals of said first and fourth counting means and to the first input terminal of said first switching means.

8. Apparatus as recited in claim 7 in which said means for resetting said third counting means comprises:

second switching means having first and second input terminals for controlling the condition of said switching means and an output terminal, said output terminal being energized by signals appearing on said second input terminal and deenergized by signals appearing on said first input terminal, said first input terminal being connected to said data terminal, said second input terminal being connected to receive signals from said fourth terminal of said first counting means;

tenth AND gating means having its input connected to the output terminal of said second switching means, to the fourth output terminal of said first counting means, and to the first output terminal of said first switching means to receive signals therefrom, and connected to deliver signals to the reset terminal of said third counting means.

9. Apparatus as recited in claim 8 in which said first and second switching means are flip-flops, the first input terminal thereof being the set terminal, the second input terminal thereof being the reset terminal, the first output terminal of said first flip-flop being the true output thereof, and the second output terminal of said first flip-flop being the false output terminal thereof, the output terminal of the second flip-flop being the false output terminal thereof.

10. Apparatus as recited in claim 9 in which said counting means are counters and said interval timing means is an interval timer, and in which said first output terminal of said interval timer is channelled through an inverting amplifier to inhibit terminals of said first and second gating means.

11. Apparatus as recited in claim 3 and further comprising:

third AND gating means, connected by its input terminals to said first output terminal of said first counting means and to said data terminal;

second bidirectional counting means having an incrementing input terminal, a decrementing input terminal, and a reset terminal, said counting means having s consecutive digital counting states, including three output terminals, the first output terminal being energized during the zero state of said counting means, the second terminal being energized during the *r* state of said counting means, and the third terminal being energized during the s state of said counting means, *r* being approximately one half of *s*;

an interval timer having start and stop input terminals and first and second output terminals, said first output terminal being energized when said timer is timing and said second output terminal being energized when said timer is not timing;

first switching means having at least one output terminal and a pair of input terminals, said output terminal being designated the true output terminal, said first input terminal being designated the set input terminal and said second input terminal being designated the reset input terminal;

third AND gating means, having its input terminals connected to the second output terminal of said second counting means to receive signals when said counting means is in its *r* state and to the output terminal of said first switching means, the output terminal of said third gating means being connected to the start terminal of said interval timing means;

said third output terminal of said second counting means being connected to deliver a signal, when said counting means is in its *s* state, to the stop terminal of said interval timer and to the set terminal of said switching means;

fourth AND gating means, having its input terminals connected to the first output terminal of said bidirectional counting means to be energized when said counting means is in its zero state, and to the second output terminal of said interval timing means, the output of said fourth gating means being connected to the second input terminal of said switching means;

the first output terminal of said interval timing means being connected to inhibit operation of said first and second gating means.

12. Apparatus as recited in claim 11 in which said switching means is a flip flop, said interval timing means is an interval timer, and the first output terminal of said interval timer is connected through an inverting amplifier to inhibit terminals of said first and second gating means.

13. In combination:

A data terminal for receiving data;

first counting means for generating timing signals;

clock means connected to drive said counting means;

means, connected to said data terminal, to increment and decrement said counting means, and to adjust said timing signals relative to incoming data to compensate for signal jitter and to cause periodically received data to arrive in a predetermined portion of the count of said counting means;

means for generating a signal indicating synchronization of incoming data with said timing signals;

interval time delay means connected to inhibit the incrementing and decrementing of said first counting means, after said synchronizing indicating signal has been generated until a predetermined time delay has occurred, whereby said timing signals are unaffected by temporary fading of data on said data terminal.

14. Apparatus as recited in claim 13 and further comprising resynchronization means, connected to said clock means and said data terminal to generate an output signal to jam said counting means into synchronization with data on said data terminal after a predetermined number of data signals are received on said data terminal in substantially the same position in different timing periods.

* * * * *

Disclaimer and Dedication 3,668,315.—*James O. Heitzman*, Fullerton, Calif. RECEIVER TIMING AND SYNCHRONIZATION SYSTEM. Patent dated June 6, 1972. Disclaimer and dedication filed July 17, 1972, by the assignee, *Hughes Aircraft Company*.

Hereby disclaims all claims of said patent and dedicates to the Public the entire term of said patent.

[*Official Gazette January 30, 1973.*]